Patented Sept. 21, 1954

2,689,870

UNITED STATES PATENT OFFICE 2,689,870

METHOD FOR THE PREPARATION OF ARYL SUBSTITUTED PRIMARY ALCOHOLS BY HYDROGENOLYSIS OF 4-ARYL-1,3-DI-OXANES

Thomas R. Steadman, Akron, Ohio, assignor to The B. F. Goodrich Company, New York, N. Y., a corporation of New York No Drawing. Application June 1, 1950, Serial No. 165,574

6 Claims. (Cl. 260—618)

This invention relates to a novel method for the preparation of aryl substituted primary alcohols, and pertains more particularly to the preparation of such alcohols by the hydrogenolysis of 4-aryl-1,3-dioxanes.

It is known that dibasic acid esters of certain aryl substituted alcohols function as plasticizers for synthetic resins. However, due to the fact that the aryl substituted alcohols have been obtainable heretofore only with great difficulty and/or from relatively costly raw materials, esters of these alcohols have not been utilized to any great extent as plasticizers.

Accordingly, it is an object of this invention to provide a method whereby aryl substituted alcohols are obtained economically and in high yields. A second object is to prepare aryl substituted alcohols from which esters useful as plasticizers for synthetic resins can be prepared. A third object is to prepare aryl substituted alcohols which are useful as chemical intermediates in the preparation of esters, amides, acids, and other chemical compounds. Other objects of the invention will be apparent from the description which follows.

It has now been discovered that the above and other objects are readily accomplished by the hydrogenolysis of 4-aryl-1,3-dioxanes which possess the formula

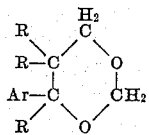

wherein Ar is an aryl radical and each R is hydrogen or hydrocarbon and may be the same or different. The 4-aryl-1,3-dioxanes are prepared by reacting formaldehyde with styrene or substituted styrenes according to the method described by Shortridge, Journal of the American Chemical Society, vol. 70, page 873 (1948). By the hydrogenolysis of the 4-aryl-1,3-dioxanes there are obtained in extremely high yields and purity aryl substituted alcohols which are very valuable in the preparation of plasticizers and for many other purposes. The hydrogenolysis reaction may be represented by the folowing equation:

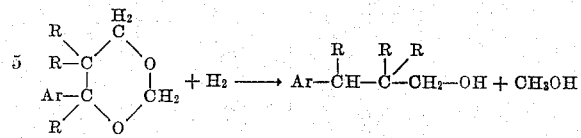

wherein Ar and R have the significance set forth hereinabove.

Among the 4-aryl-1,3-dioxanes which may be used to give aryl substituted alcohols are included 4-phenyl-1,3-dioxane, 4-tolyl-1,3-dioxane, 4-naphthyl-1,3-dioxane, 4-phenyl-5-methyl-1,3-dioxane, 4-phenyl-5,6-dimethyl-1,3-dioxane, 4-naphthyl-5-butyl-1,3-dioxane, 4-phenyl-4-methyl-1,3-dioxane, 4-phenyl-4-butyl-5-hexyl-1,3-dioxane, 4-phenyl-4-ethyl-5,6-diethyl-1,3-dioxane, 4-phenyl-4-methyl-1,3-dioxane, 4-naphthyl-4-ethyl-1,3-dioxane, 4,5-diphenyl-1,3-dioxane, 4-phenyl-6-tolyl-1,3-dioxane and the like. The above listed compounds are representative of the 4-aryl-1,3-dioxanes which may be utilized in the process of the present invention, but it is to be understood that any 4-aryl-1,3-dioxane possessing the structure shown in the foregoing paragraph is operative. The preferred 4-aryl-1,3-dioxanes, however, are those in which each R is hydrogen or a saturated aliphatic hydrocarbon radical containing from 1 to 6 carbon atoms.

The hydrogenolysis of 4-aryl-1,3-dioxanes is readily accomplished in the conventional manners for carrying out reactions with hydrogen provided that the temperature is maintained below 200° C. For example, one preferred method consists simply in passing hydrogen into the 4-aryl-1,3-dioxane in the presence of a hydrogenation catalyst and at atmospheric pressure, the dioxane and the catalyst being maintained at a temperature below 200° C. Alternatively, the hydrogenolysis may be carried out under superatmospheric pressures preferably from 2,000 to 6,000 lbs./sq. in. or even higher. The process may be carried out either batchwise or in a continuous manner, wherein the 4-aryl-1,3-dioxane is dispersed in a fine spray over a fixed bed of catalyst, this latter method assuring a high ratio of catalyst to substrate material and excellent contact among the three phases. Regardless of the method employed, however, the temperature must be maintained below 200° C., since at temperatures of 200° C. or higher the aryl group attached to the 4-position of the dioxane ring becomes completely saturated, forming, for example in the hydrogenolysis of 4-phenyl-1,3-dioxane, 3-cyclohexylpropanol, rather than the desired 3-phenylpropanol.

When the hydrogenolysis is complete the aryl substituted primary alcohol may be recovered simply by filtering to remove the catalyst and then distilling the filtrate to remove any unchanged 4-aryl-1,3-dioxane and impurities, if any. The alcohols thus obtained are of high purity and ordinarily require no further purification before they are utilized in the preparation of esters or for other purposes.

The nature of the catalyst is not strictly a critical feature of the present invention but is of considerable importance in that the various copper chromites preferably in pelletized form are especially preferred catalysts since highest yields are most readily obtained when they are utilized. However, any of the other commonly used hydrogenation catalysts such as platinum, platinum oxides, nickel, nickel oxides, chromic oxides or mixtures of such catalysts, and the like may also be employed. The catalyst may be used either alone or with binders such as graphite, or mounted on an inert catalyst support such as kieselguhr, alumina, silica, pumice or the like. In most cases the catalyst may be reused many times. In general it may be stated that the catalyst should comprise from 5 to 25% by weight based on the weight of the dioxane, but smaller or larger amounts may also be used if desired.

The more detailed practice of the invention is illustrated by the following examples, wherein all parts are by weight. There are, of course, many other reaction procedures which are operative other than these specific examples and which will be apparent to those skilled in the art.

*Example I*

A mixture of 104 parts of styrene, 333 parts of 37% aqueous formaldehyde and 28.6 parts of 96% sulfuric acid is refluxed and stirred for about 16 hours. The organic layer is washed successively with dilute sodium carbonate and sodium acid sulfite and water. The product is dried by azeotropic distillation with 88 parts of benzene and vacuum distilled. A 90% yield of 4-phenyl-1,3-dioxane (B. P. 95° C./2 mm.; $N_d^{25}=1.5288$ and $d^{25}=1.101$) is obtained.

656 parts of 4-phenyl-1,3-dioxane prepared according to the above method and 132 parts of pelletized copper chromite are charged into a stainless steel rocking autoclave. After purging the bomb, hydrogen at a pressure of 4100 lbs./sq. in. is introduced into the bomb. The bomb is then heated to 175° C. for a period of 8 hours. After the heating period the bomb is rinsed with methanol and the contents are filtered to remove the catalyst. After removing the methanol by distillation 529 parts of product (B. P. 117–122° C./14 mm.) are obtained. By infrared analysis it is determined that the product contains 99% 3-phenylpropanol and 1% 4-phenyl-1,3-dioxane. The yield of the desired 3-phenylpropanol is 96%.

*Example II*

Example I is repeated except that 66 parts of copper chromite are utilized and the hydrogenation is carried out for 12 hours. The hydrogenation product analyzes 72.8% 3-phenylpropanol and 27.2% 4-phenyl-1,3-dioxane. The yield of 3-phenylpropanol is 93%.

As has been disclosed hereinabove the alcohols prepared according to the process of this invention are very useful compounds. For example, esters of these alcohols with aliphatic and aromatic dibasic acids such as adipic acid, pimelic acid, sebacic acid, or phthalic acid, impart to vinyl resins excellent heat stability and electrical and physical properties.

Moreover, the alcohols prepared by the present process possess pleasant odors, the odor of 3-phenylpropanol for example being reminiscent of cinnamon. Thus, these high boiling alcohols and their volatile esters are useful in the perfume industry as well as for multifarious other purposes.

Although specific examples of the invention have been herein described, it is not intended to limit the invention solely thereto, but to include all of the variations and modifications falling within the spirit and scope of the appended claims.

I claim:

1. The method which comprises reacting hydrogen with a compound of the structure

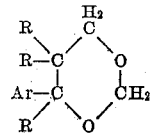

wherein Ar is an aryl radical and each R is selected from the class consisting of hydrogen and hydrocarbon radicals having from one to about 6 carbon atoms, in the presence of a hydrogenation catalyst and at a temperature below 200° C., thereby to obtain methanol and a primary alcohol of the structure

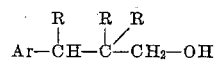

wherein Ar and R have the significance given above.

2. The method which comprises reacting hydrogen with a compound of the structure

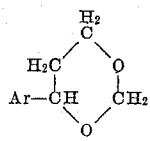

wherein Ar is an aryl radical, in the presence of a hydrogenation catalyst and at a temperature below 200° C., thereby to obtain methanol and a primary alcohol of the structure

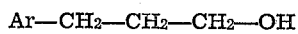

wherein Ar has the significance given above.

3. The method which comprises reacting hydrogen with 4-phenyl-1,3-dioxane, in the presence of a hydrogenation catalyst and at a temperature below 200° C., thereby to obtain methanol and 3-phenylpropanol.

4. The method which comprises reacting hydrogen with 4-phenyl-1,3-dioxane, in the presence of a copper chromite catalyst and at a temperature below 200° C., thereby to obtain methanol and 3-phenylpropanol.

5. The method which comprises reacting hydrogen with 4-phenyl-1,3-dioxane, in the presence of a copper chromite catalyst, at a temperature below 200° C. and at a pressure in excess of 2000 lbs./sq. in., thereby to obtain methanol and 3-phenylpropanol.

6. A method for preparing 3-phenyl-propanol-1, which comprises reacting gaseous hydrogen with 4-phenyl-1,3-dioxane, in the presence of a copper chromite catalyst and at a temperature not above 200° C.

References Cited in the file of this patent

UNITED STATES PATENTS

| Number | Name | Date |
|---|---|---|
| 2,217,354 | Appel | Oct. 8, 1940 |
| 2,524,096 | Wood | Oct. 3, 1950 |
| 2,537,813 | Bremner et al. | Jan. 9, 1951 |

FOREIGN PATENTS

| Number | Country | Date |
|---|---|---|
| 105,085 | Austria | Dec. 17, 1926 |
| 496,264 | Great Britain | Nov. 25, 1938 |

OTHER REFERENCES

Gilman et al., Organic Chemistry—An Advanced Treatise, vol. I (1943), pp. 822-3, John Wiley and Sons, New York, N. Y.

Baker et al., Jour. Am. Chem. Soc., vol. 70, pages 1490-2 (1948).

Schiff, Liebig's Annalen (Supp.), vol. 5, pages 158, 159 (1867).